US006832305B2

(12) United States Patent
Park et al.

(10) Patent No.: US 6,832,305 B2
(45) Date of Patent: Dec. 14, 2004

(54) METHOD AND APPARATUS FOR EXECUTING COPROCESSOR INSTRUCTIONS

(75) Inventors: Sang Hyun Park, Yongin (KR); Seh-Woong Jeong, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 599 days.

(21) Appl. No.: 09/808,406

(22) Filed: Mar. 14, 2001

(65) Prior Publication Data

US 2002/0133689 A1 Sep. 19, 2002

(51) Int. Cl.[7] .............................................. G06F 15/16
(52) U.S. Cl. ....................................... 712/34; 712/205
(58) Field of Search .......................... 712/34, 35, 205, 712/206, 209, 210, 212, 213

(56) References Cited

U.S. PATENT DOCUMENTS 4,979,102 A  * 12/1990  Tokuume .................... 709/213
5,577,250 A  * 11/1996  Anderson et al. ........... 718/100
5,752,071 A  *  5/1998  Tubbs et al. ................. 712/34
6,532,530 B1 *  3/2003  Kim et al. .................... 712/35
6,564,238 B1 *  5/2003  Kim et al. ................... 708/513

FOREIGN PATENT DOCUMENTS

WO      WO 88/04809 A1 *  3/1988

* cited by examiner

Primary Examiner—Henry W. H. Tsai
(74) Attorney, Agent, or Firm—F. Chau & Associates, LLC

(57) ABSTRACT

A semiconductor device having a main processor and a coprocessor for data processing is disclosed, the device comprising a main program memory for storing main processor instructions and a first portion of coprocessor instructions, a coprocessor program memory for storing a second portion of coprocessor instructions, and a predecoder for predecoding at least one bit of each instruction fetched from the main program memory and for generating an active coprocessor control signal upon predecoding a coprocessor type instruction, wherein the second portion of coprocessor instructions are fetched directly from the coprocessor program memory and the first portion and the second portion of coprocessor instructions are processed by the coprocessor upon receipt of the active coprocessor control signal.

19 Claims, 5 Drawing Sheets

METHOD AND APPARATUS FOR EXECUTING COPROCESSOR INSTRUCTIONS

BACKGROUND OF THE INVENTION

1. Technical Field

The present invention relates to a semiconductor device having a main processor and a coprocessor for data processing, and more particularly a semiconductor device having a main program memory and a coprocessor program memory for storing different types of instructions.

2. Discussion of Related Art

In a data processing device having a CPU or a main processor, a microprocessor distinct from the main processor, called a coprocessor, is used to perform specified functions that the CPU cannot perform or cannot perform as well and/or as quickly. For example, a coprocessor like a FPU (floating point unit) is a special purpose coprocessor used mainly to perform floating-point operations, vector operations and scalar operations. While a CPU can perform these functions, the coprocessor can perform these functions faster. In such a case, the CPU is used instead to fetch instructions, input or output data, and control program sequences. The CPU actually fetches all instructions and operands for both the main processor and coprocessor. The coprocessor performs the operations specified in the instruction fetched and decoded by the CPU. If the instruction is a data input/output operation, the CPU controls the coprocessor to input or output the data. It is not uncommon that the CPU even controls coprocessor pipelining. That is, the CPU fetches CPU and coprocessor instructions while the coprocessor performs coprocessor operations.

In conventional data processing devices, it may be difficult to pipeline, i.e., overlap execution of both CPU instructions and coprocessor instructions, because the coprocessor receives its instructions after the CPU fetches and decodes the coprocessor instructions. There are two conventional ways of configuring a pipeline in the data processor. According to one of the two ways, CPU and coprocessor use a same pipeline. In the second way, CPU and coprocessor use different, respective pipelines. The coprocessor receives and decodes an instruction transferred from the CPU. This coprocessor decoding cycle is time consuming and the cycle can likely be a critical timing path of a pipeline processing. In the second way, although the critical path problem of the first way is less severe, the need to maintain precise interrupts in cases of interrupt or exception operations require burdensome management by the CPU. The data bus width and instruction bit length of a coprocessor is usually wider and longer than that of the CPU. Therefore, if the CPU fetches a coprocessor instruction, a cycle loss (stall) of the pipeline processing may occur because the CPU has to repeat the coprocessor instruction fetch cycle several times until one instruction is completely fetched by the CPU. Consequently, this increases complexity for pipeline control and interrupt operations.

Accordingly, a need exists for a data processor which efficiently and quickly fetches CPU and coprocessor instructions. A need also exists for a data processing system having a tightly coupled main processor and coprocessor for executing different types of instructions in a single pipeline stream.

SUMMARY OF THE INVENTION

A data processing device having a main processor and a coprocessor is provided wherein the coprocessor has its own data bus to fetch coprocessor instructions. According to an aspect of the present invention, a coprocessor program memory is used to store coprocessor instructions and a predecoder is provided for predecoding an instruction fetched by the main processor.

It is an object of the present invention to provide a data processing device wherein the coprocessor is capable of fetching its own instruction through its own data bus and memory, preferably within the same instruction fetch cycle of the main processor.

According to an aspect of the present invention, a semiconductor device having a main processor and a coprocessor is provided for data processing, comprising a main program memory for storing main processor instructions and a first portion of coprocessor instructions; a coprocessor program memory for storing a second portion of coprocessor instructions; and a predecoder for predecoding at least one bit of each instruction fetched from the main program memory and for generating an active coprocessor control signal upon predecoding a coprocessor type instruction, wherein the second portion of coprocessor instructions are fetched directly from the coprocessor program memory and said first portion and said second portion of coprocessor instructions are processed by the coprocessor upon receipt of the active coprocessor control signal.

The coprocessor active control signal and the main processor are preferably synchronized to a system clock. The main processor instructions are m-bits and the coprocessor instructions are m+n bits, the n-bits being stored in the coprocessor memory, wherein said m-bits of said main processor instruction are fetched from the main program memory by the main processor and sent to the coprocessor after buffering by an instruction fetch buffer of said main processor. The m-bits are preferably sent through an instruction register in said main processor before being forwarded to the coprocessor.

According to another embodiment of the present invention, the m bits are forwarded directly to the coprocessor from the main program memory and the n bits are forwarded directly to the coprocessor from the coprocessor program memory.

A method of data processing in a semiconductor device having a main processor and a coprocessor is also provided, said main processor for executing m bit instructions, said coprocessor for executing m+n bit coprocessor instructions, the method comprising the steps of: fetching by the main processor an m-bit instruction from a main program memory addressed by a program address; and fetching by the coprocessor an n-bit instruction from a coprocessor program memory addressed by the program address upon decoding a predefined coprocessor code by the main processor.

According to a preferred embodiment of the present invention, the step of decoding a coprocessor code is performed by a predecoder of the main processor, the predecoder decoding at least one bit of said m-bits allocated for signalling a coprocessor operation, the fetching steps by the main processor and the coprocessor are preferably synchronized to a system clock and the fetching by the main processor and coprocessor occur within a system clock cycle.

Preferably the m-bit instruction fetched from the main memory is forwarded to said coprocessor to form a coprocessor instruction of m+n bits.

BRIEF DESCRIPTION OF THE DRAWINGS

Further objects, features and advantages of the invention will become apparent upon consideration of the following detailed description in conjunction with the drawings, in which.

DETAILED DESCRIPTION OF PREFERRED EMBODIMENTS OF THE INVENTION

In the following description and drawings, well-known element structures, circuit blocks, and architectural functions will not be described in detail in order to avoid obscuring the invention. And, for the most part, details concerning timing considerations will be omitted in as much as such details are not necessary to obtain a complete understanding of the present invention and are within the skills of persons of ordinary skill in the relevant art. The present invention will now be described more in detail hereinafter with reference to the accompanying drawings.

Figure 1:
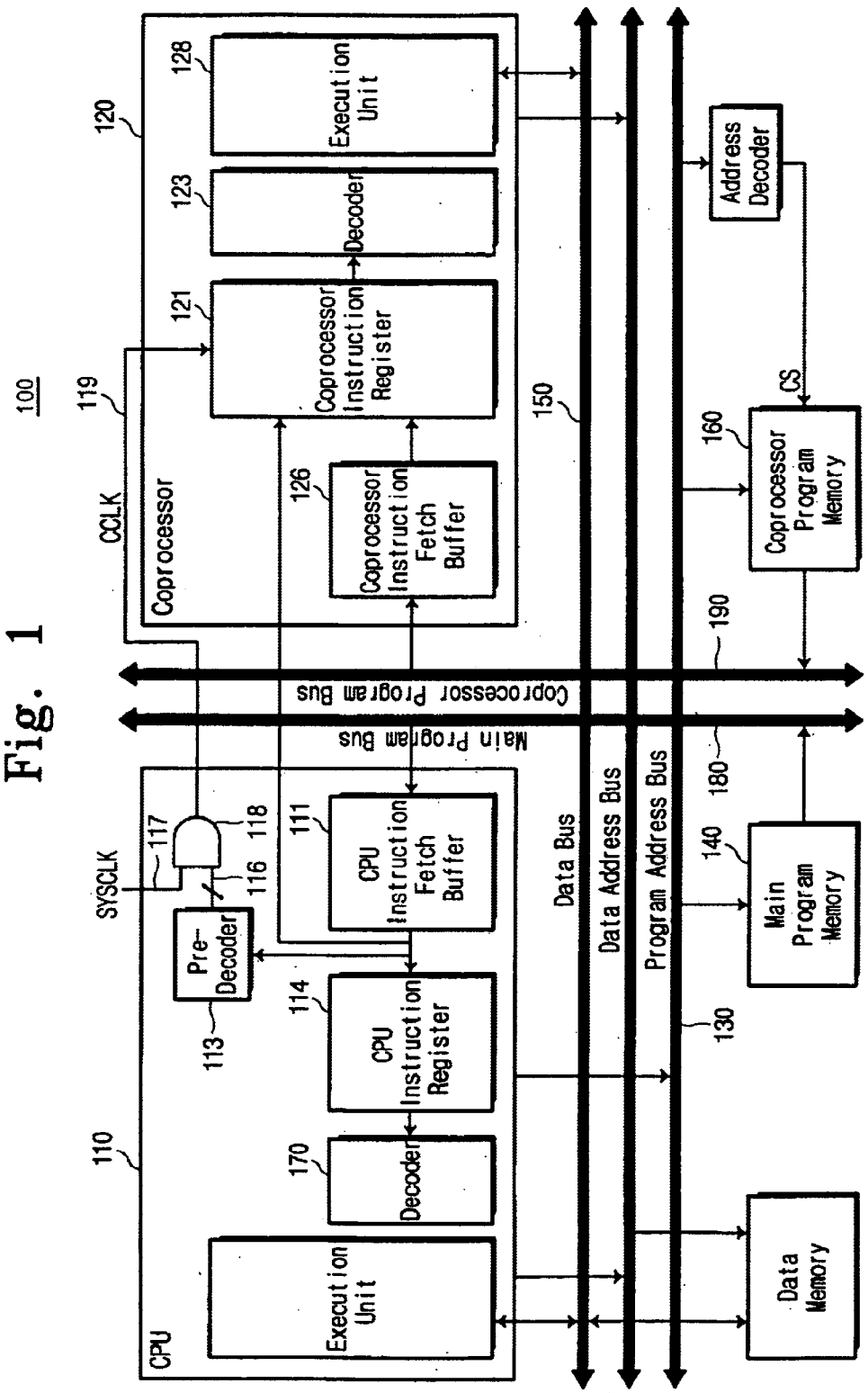
FIG. 1 is a block diagram of a data-processing system having a main processor and a coprocessor according to an embodiment of the invention.

FIG. 1 shows a data-processing system 100 having different processors for executing different types of instructions according to the invention. Main processor (hereinafter CPU) 110 executes CPU instructions while coprocessor 120 executes coprocessor instructions, which include mathematical calculations such as floating-point operations, vector operations and scalar operations, etc. The data processing system has a 5 stage pipeline of fetching, decoding, executing, memory cycle, write back cycle. The bus structure of the data processor is known as the Harvard structure, in which instruction fetch and memory access are executed in one cycle.

According to a preferred embodiment of the present invention, CPU 110 executes a new instruction by fetching an instruction stored in main program memory (MPM) 140. An address, preferably 16 bits, is sent via address bus 130 to main program memory 140 and coprocessor program memory (CPM) 160. Main program memory 140 and CPM 160 output the addressed instruction onto processor data bus 150, and the instruction read from MPM 140 is buffered at CPU fetch buffer 111 and then is latched into Instruction Register (IR) 114 of CPU 110. The coprocessor instruction read from CPM 160 is 'n' bits, preferably 16 bits, which represent the least significant bits (LSBs) portion of the entire coprocessor instruction. The n-bit instruction is buffered by coprocessor fetch buffer 126 and then latched by coprocessor instruction register 121 of coprocessor 120. The latching of the coprocessor instruction in register 121 will be synchronized to the system clock. This process will be further described below. It is known to one skilled in the art that coprocessor type instructions can be signalled in the 'c' most significant bits (MSBs) of the instruction. For purposes of illustration, the first 3 bits, or c=3, is used in the present embodiment. It is also readily apparent that the 16-bit address format, serves to illustrate the exemplary embodiment, but the device and method of the present invention is applicable to any number of addressing bits, any distribution of addressing between the main processor or coprocessing addressing, any number of bit width for the CPU or coprocessor instruction, and any designation of which of the address bits are used to signal a coprocessor operation.

Figure 5:
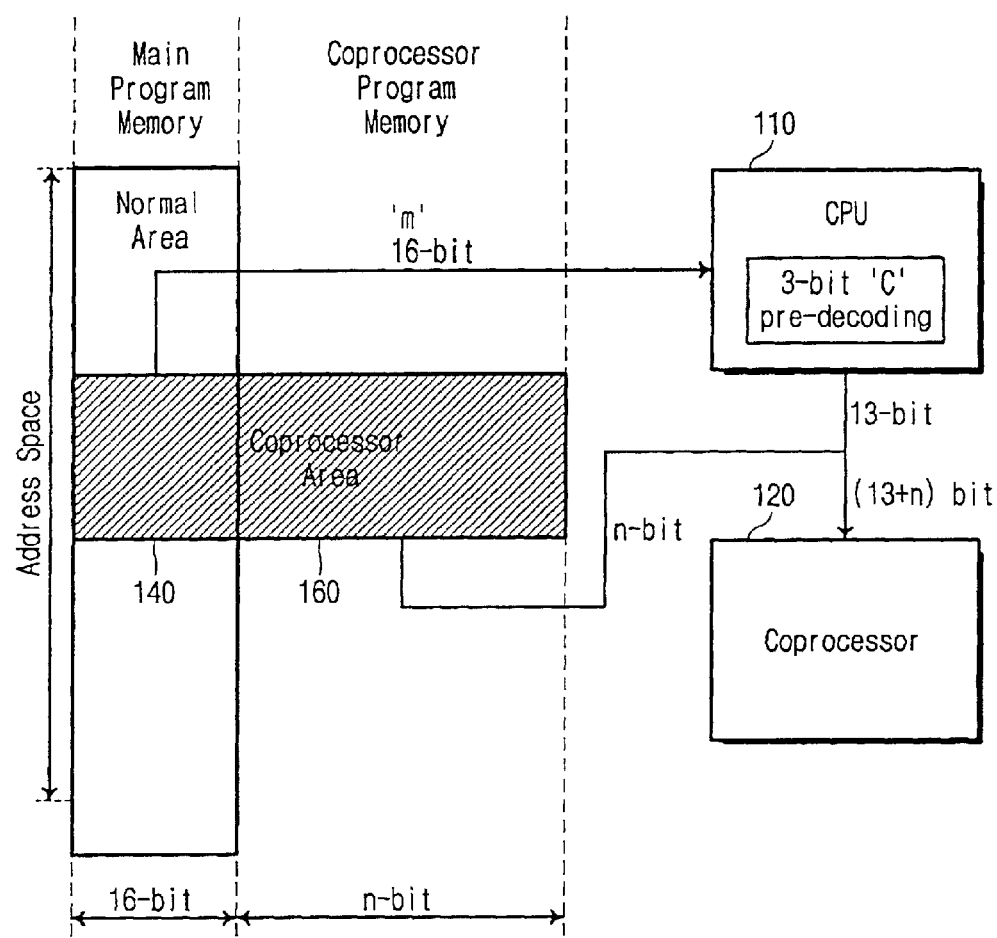
FIG. 5 shows a distribution map of the coprocessor instruction according to an embodiment of the present invention.

Predecoder 113 of CPU 110 receives the 'c' MSB bits of the main program instruction and predecodes the instruction type code of the fetched instruction prior to decoding of the whole instruction by decoder 170 of CPU 110. If the instruction type code indicates a coprocessor instruction, the Predecoder 113 generates a Coprocessor Instruction Signal (COPI) 116. The COPI signal is synchronized with system clock (SYSCLK) 117 by AND gate 118. The output of the AND gate 118, Coprocessor Clock (CCLK) 119, is used as the clock signal for synchronously clocking the coprocessor instruction into coprocessor 120. In the present embodiment, CCLK 119 is sent to an Instruction Register 121 of coprocessor 120 and CCLK 119 serves as a coprocessor instruction register clock. According to the present embodiment, coprocessor 120 receives a complete coprocessor instruction comprising MSBs fetched by the CPU 110 and LSBs fetched by coprocessor 120. If the instructions stored in the main program memory 140 are 16-bits wide (m=16) and the coprocessor instructions stored in CPM 160 are 16 bits wide (n=16), the entire coprocessor instruction width is (m−c)+n bits or (16−3)+16 or 29 bits wide, with 3 'c' MSB bits designated for coprocessor predecoding. Coprocessor 120 decodes the complete 29 bit coprocessor instruction with decoder 123. FIG. 5 illustrates the distribution of the instruction bits according to an embodiment of the present invention. It can be seen that 16 'm' bits are read from MPM 140 into CPU 110, wherein 3 'c' bits are extracted for predecoding. 'N' bits are read from CPM 160 and are added to (m−c) 13-bits from CPU 110 to form a (13+n)-bit coprocessor instruction.

Referring to FIG. 1, the 16 'm' bit instruction fetched from MPM 140 is sent to CPU 110, first into fetch buffer 111. At the output of fetch buffer 111, the 3 'c' MSB bits are branched off the predecoder 113, where if the 'c' bits signal a coprocessor operation, signal COPI 116 and CCLK 119 are activated. 13 of the 16 m bits (m−c) are branched to coprocessor 120. CCLK 119 clock into the coprocessor instruction register 121 the entire 29 bits of coprocessor instruction, with 13 bits from the output of CPU instruction fetch buffer 111 and 16 'n' bits from CPM 160 through coprocessor instruction fetch buffer 126. In this way, decoder 123 of coprocessor receives the entire coprocessor instruction for decoding. The instruction is synchronized to the system clock by CCLK 119. The entire m-bit instruction are forwarded to CPU instruction register 114 for processing by CPU 110. If the instruction is not a coprocessor operating CPU 110 processes the instruction as a CPU instruction in normal manner.

Figure 2:
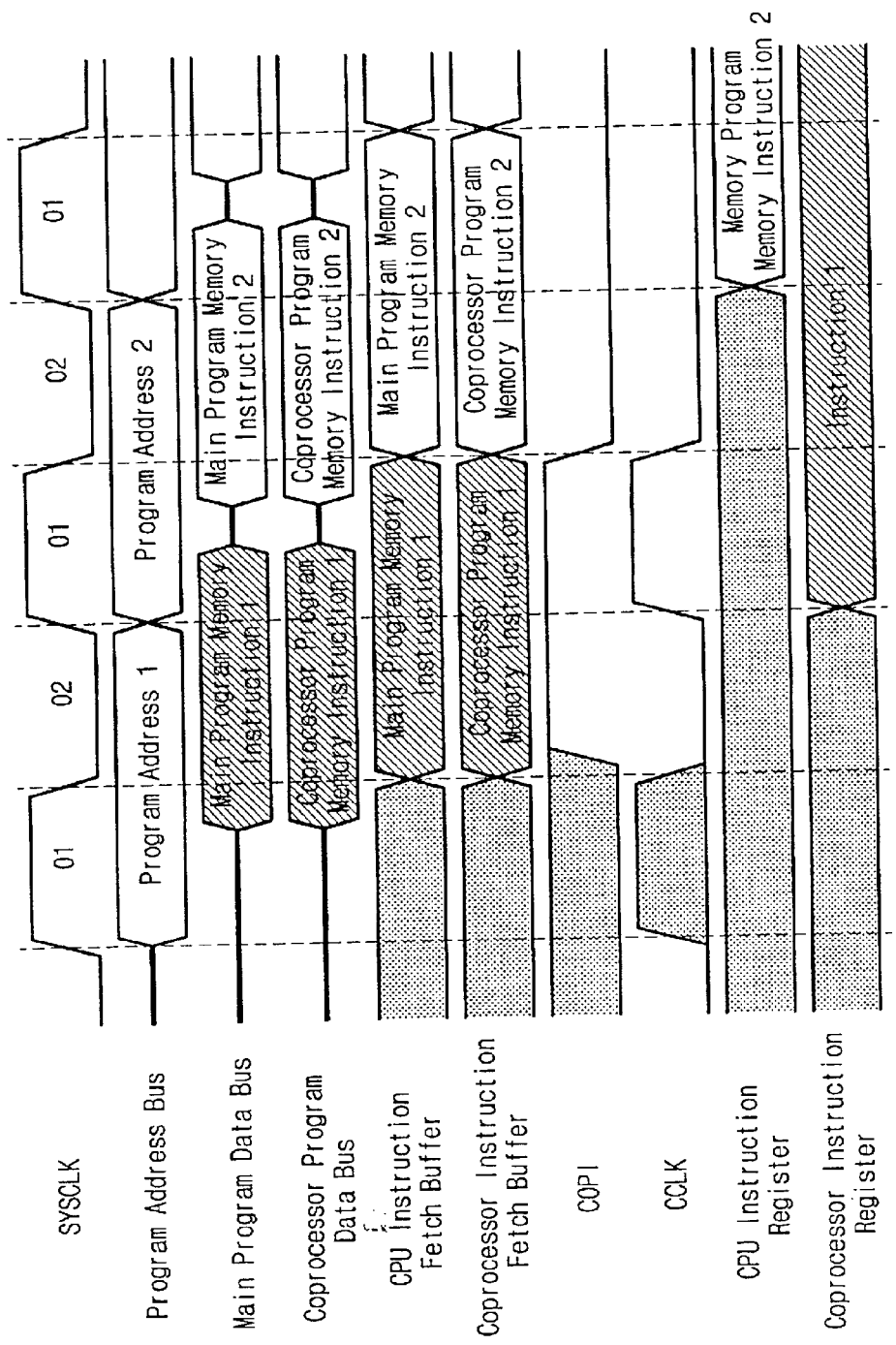
FIG. 2 is a timing diagram of instruction fetch operation of the system of FIG. 1.

FIG. 2 is a timing diagram illustrating exemplary timing of a data processor according to the present invention. The pipeline is preferably a latch-based circuit operating in response to 2-phase ($\phi 1$, $\phi 2$) clock cycles such that one stage of the pipeline is comprised of phase 1 ($\phi 1$) latch and phase 2 ($\phi 2$) latch. CPU 110 and coprocessor 120 has the same pipeline structure operating in response to a synchronized system clock (SYSCLK). CPU 110 generates an instruction address onto address bus (AB) 130 and then the CPU and coprocessor fetches the addressed instruction through Main Program Bus 180 and Coprocessor Program Bus 190, respectively in $\phi 1$ and $\phi 2$ of the instruction fetch cycle into each instruction fetch buffer. The fetched instruction is latched into instruction registers IR 114 and IR 121 in phase 1 of the next (decoding) cycle. During phase 2 ($\phi 2$) of the fetch cycle, the instruction type code (LSB portion of the fetched instruction) is decoded by the predecoder 113. If it is determined from the instruction type code that the instruction is a coprocessor instruction, predecoder 113 generates the COPI signal 116. The COPI 116 is synchronized with SYSCLK 117 by AND gate 118 to generate CCLK 119. CCLK 119 sychrnonizes the coprocessor pipeline with the CPU pipeline. Coprocessor 120 fetches the LSB portion of the coprocessor instruction directly from the coprocessor program memory 160 during every ø2 of fetch cycle. Within ø2 of the fetch cycle, the instruction fetching by the CPU and predecoding instruction type code are processed. During the next SYSCLK cycle or phase 1 of decoding cycle, coprocessor 120 latches the LSB portion of the coprocessor instruction from the coprocessor instruction fetch buffer 126 into coprocessor instruction register 121 in response to CCLK 119. The total data bus width of Main Program Bus 180 and Coprocessor Program Bus 190 is designed to be wide enough to fetch one coprocessor instruction at a time. If the result of predecoding indicates a non-coprocessor instruction, the COPI 116 and CCLK 119 and are not generated and coprocessor 120 does not latch an instruction into coprocessor instruction register 121.

Figure 3:
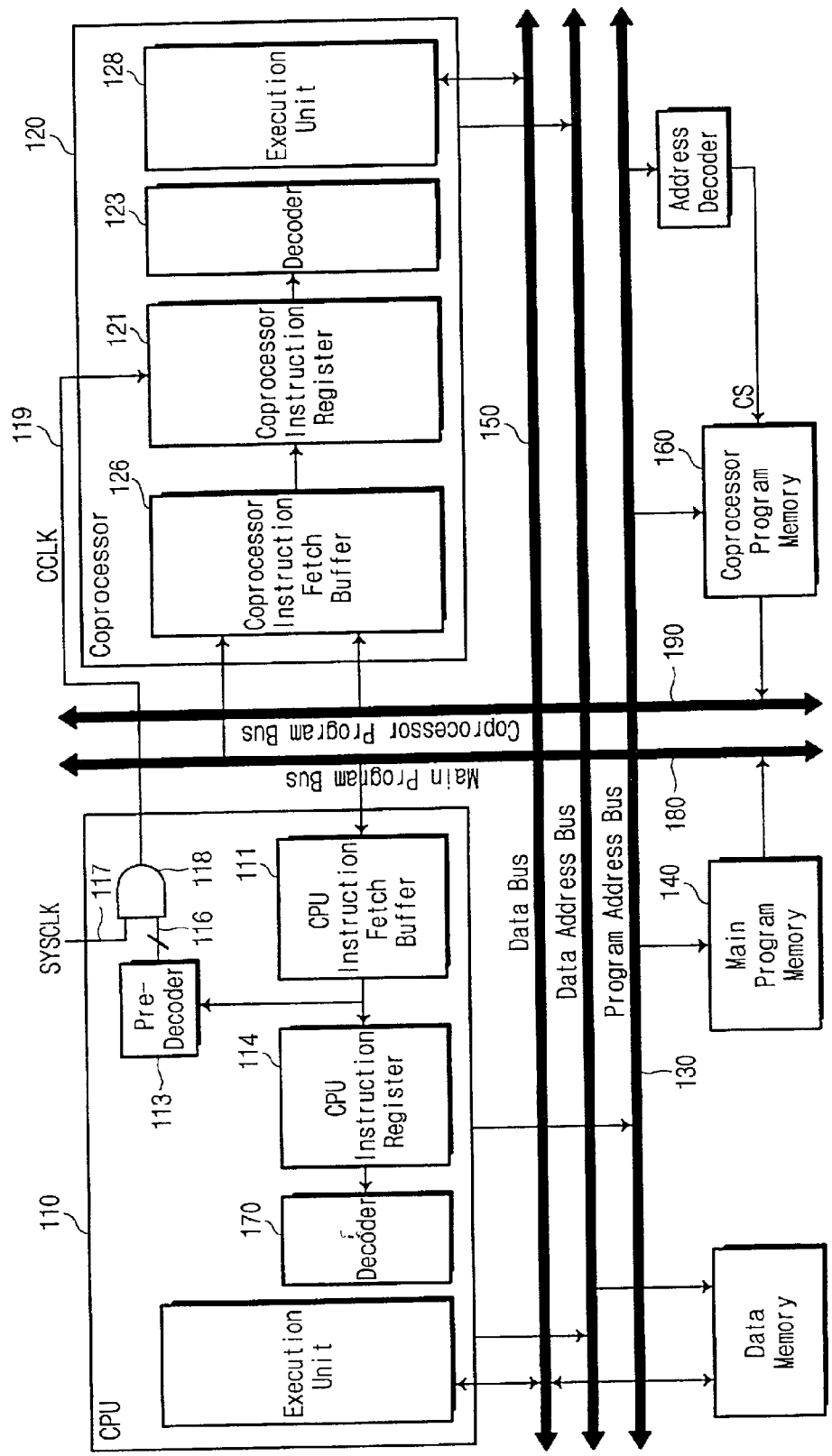
FIG. 3 is a block diagram of a data processor according to another embodiment of the present invention.

FIG. 3 shows another embodiment of a data processing device according to the present invention. The coprocessor instruction fetch buffer 126 according to this embodiment is configured to receive both the LSB coprocessor instruction and the MSB portion of the coprocessor instruction from main program memory 140. Thus, the entire coprocessor instruction is output from fetch buffer 126 and latched into coprocessor instruction register 121 in response to CCLK 119. It is understood that preferably only m-c bits of the instructions read from MPM 140 is connected to the instruction fetch buffer 126 via Main Program Bus 180. The entire m-bit instruction is forwarded to CPU 110 for processing including predecoding, whether the instruction is a CPU or a coprocessor operation. An advantage derived from such configuration includes a speedier receipt of the MSB portion of the coprocessor instruction by coprocessor 120.

Figure 4:
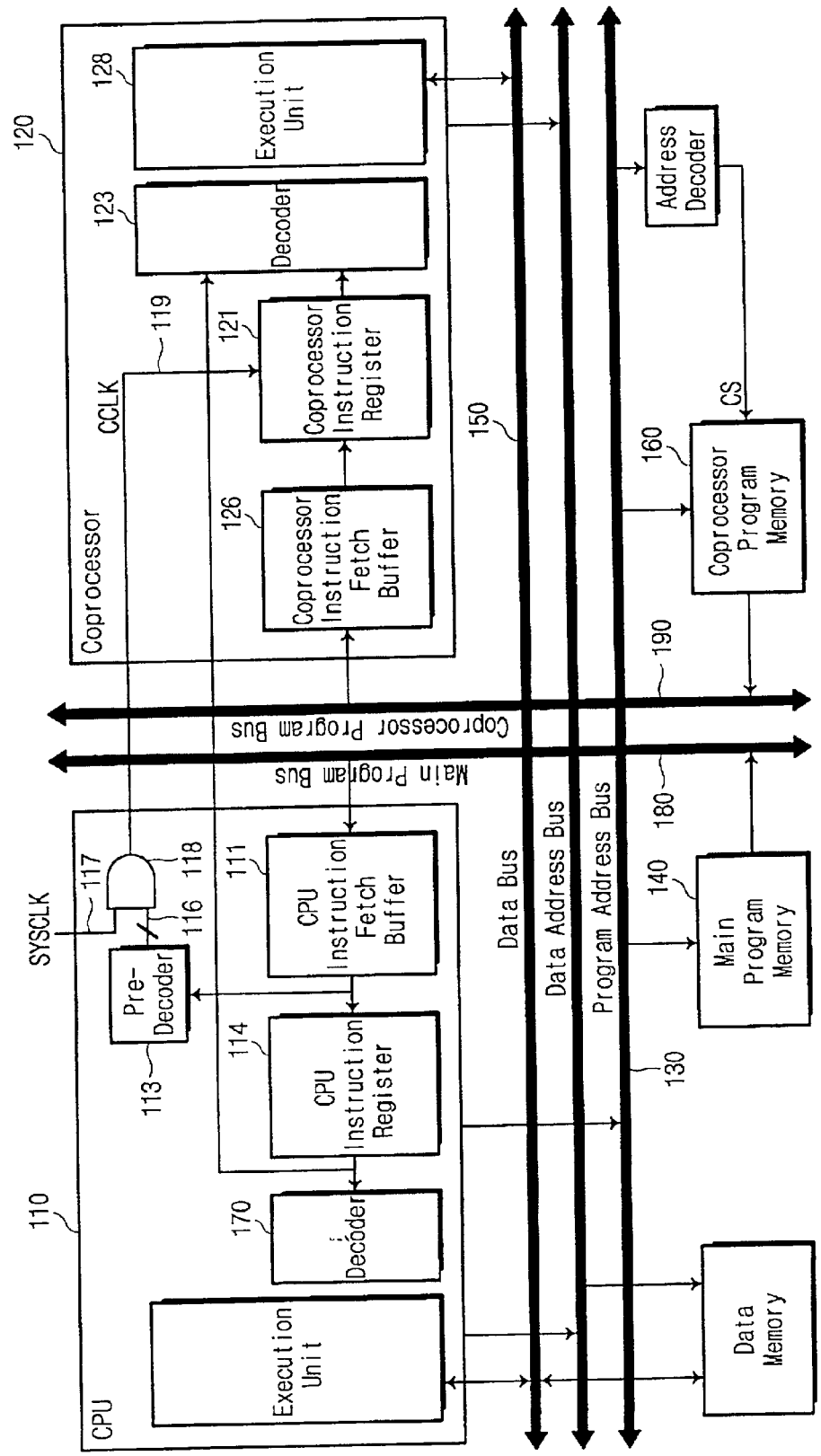
FIG. 4 is a block diagram of a data processor according to still another embodiment of the present invention.

FIG. 4 shows still another embodiment of a data processing device according to the present invention. The coprocessor instruction fetch buffer 126 according to this embodiment receives the LSB portion of the coprocessor instruction from CPM 160. The MSB portion of the coprocessor instruction from MPM 140 is first forwarded to CPU 110 wherein the 'c' MSB bits are predecoded by predecoder 113. The m-bit instruction is then latched into CPU instruction register 114. Then, (m–c) bits of the instruction is output directly to decoder 123 of coprocessor 120. When predecoder 113 determines that the instruction is a coprocessor operation, the LSB portion of the coprocessor instruction is latched by coprocessor instruction register121 in response to CCLK 119. In such way, the MSB (m–c) bits and the n-bits of the coprocessor instruction are synchronized to the system clock SYSCLK.

Advantageously, the present invention facilitates the use of DSP, vector processor or scalar processor, and like processors which require a wide instruction bit width to be employed as a coprocessor. Further, pipeline operations of CPU and coprocessor are synchronized in a single processing stream without a critical time path of fetching instruction, improving the pipeline rate.

Although the present invention has been described with a predecoder for predecoding a coprocessor instruction, the predecoder being disposed within the CPU, it is readily apparent to one skilled in the art that the predecoder can perform the described functions whether it is disposed within the CPU, coprocessor, or outside of either the CPU or the coprocessor.

In the drawings and specification, there have been disclosed illustrative preferred embodiments of the invention and, although specific terms and number of bits of addressing and instruction are employed, they are used in a generic and descriptive sense only and not for purposes of limitation. Numerous modifications and variations of the present invention are possible in light of the above teachings. It is therefore to be understood that, within the scope of the appended claims, the present invention can be practiced in a manner other than as specifically described herein.

What is claimed is:

1. A semiconductor device having a main processor and a coprocessor for data processing, comprising:

a main program memory for storing main processor instructions and a first portion of coprocessor instructions;

a coprocessor program memory for storing a second portion of coprocessor instructions; and a predecoder for predecoding at least one bit of each instruction fetched from the main program memory and for generating an active coprocessor control signal upon predecoding a coprocessor type instruction, wherein the second portion of coprocessor instructions are fetched directly from the coprocessor program memory and said first portion and said second portion of coprocessor instructions are processed by the coprocessor upon receipt of the active coprocessor control signal.

2. The device of claim 1, wherein said coprocessor active control signal and said main processor are synchronized to a system clock.

3. The device of claim 1, wherein m-bits of the main processor instructions are stored in the main program memory and n-bits of the coprocessor instructions are stored in the coprocessor memory.

4. The device of claim 3, wherein said m-bits of said main processor instruction are fetched from the main program memory by the main processor and sent to the coprocessor after buffering by an instruction fetch buffer of said main processor.

5. The device of claim 4, wherein said m-bits are further sent through an instruction register in said main processor before being forwarded to the coprocessor.

6. The device of claim 3, wherein said m bits are forwarded directly to the coprocessor from the main program memory and the n bits are forwarded directly to the coprocessor from the coprocessor program memory.

7. The device of claim 3, wherein said m bits and n bits are forwarded to a register in the coprocessor for latching in response to said active coprocessor control signal.

8. The device of claim 7, wherein said m bits and n bits are forwarded to a buffer prior to the register in the coprocessor for buffering.

9. The device of claim 3, wherein said in-bits of said main processor instruction are fetched from the main program memory by the main processor and m-c bits, c being at least 1 bit, are sent to the coprocessor after buffering by an instruction fetch buffer of said main processor.

10. The device of claim 9, wherein said m-c bits are further sent through an instruction register in said main processor before being forwarded to the coprocessor.

11. The device of claim 1, wherein each of the main processor instructions and each of the coprocessor instructions are fetched using a common program address generated by the main processor.

12. A method of data processing in a semiconductor device having a main processor and a coprocessor, said main processor for executing m bit instructions, said coprocessor for executing m+n bit coprocessor instructions, the method comprising the steps of:

fetching by the main processor an n-bit instruction from a main program memory addressed by a program address; and fetching by the coprocessor an n-bit instruction from a coprocessor program memory addressed by the program address upon decoding a predefined coprocessor code by the main processor.

13. The method of claim 12, wherein said step of decoding a coprocessor code is performed by a predecoder of the main processor, the predecoder for decoding c-bits of said m-bits, said c-bits being predesignated to signify a coprocessor operation.

14. The method of claim 13, wherein said c-bits is at least one bit.

15. The method of claim 13, further including the step of forwarding said instruction fetched from the main memory to said coprocessor to form a coprocessor instruction of (m+c)+n bits.

16. The method of claim 12, wherein said fetching steps by the main processor and the coprocessor are synchronized to a system clock.

17. The method of claim 16, wherein said fetching steps by the main processor and coprocessor occur within a system clock cycle.

18. The method of claim 12, further including the steps of generating an active coprocessor control signal upon decoding by a predecoder the predefined coprocessor code and synchronizing said active coprocessor control signal to a system clock to form a control clock CCLK.

19. The method of claim 18, further including the step of latching the MSB portion of a coprocessor instruction sent from the main processor memory and the LSB portion of the coprocessor instruction from the coprocessor program memory in response to the control clock CCLK.

* * * * *